(12) United States Patent  
Rotem et al.

(10) Patent No.: US 9,032,223 B2  
(45) Date of Patent: May 12, 2015

(54) TECHNIQUES TO MANAGE OPERATIONAL PARAMETERS FOR A PROCESSOR

(75) Inventors: Efraim Rotem, Haifa (IL); Eric Distefano, Livermore, CA (US); Jim Hermerding, San Jose, CA (US); Ronny Korner, Haifa (IL); Yuval Yosef, Hadera (IL)

(73) Assignee: Intel Corporation, Santa Clara, CA (US)

( * ) Notice: Subject to any disclaimer, the term of this patent is extended or adjusted under 35 U.S.C. 154(b) by 1064 days.

(21) Appl. No.: 12/205,317

(22) Filed: Sep. 5, 2008

(65) Prior Publication Data

US 2010/0064162 A1    Mar. 11, 2010

(51) Int. Cl.
  *G06F 1/26* (2006.01)
  *G06F 1/20* (2006.01)
  *G06F 11/30* (2006.01)

(52) U.S. Cl.
  CPC ............ *G06F 1/206* (2013.01); *G06F 11/3006* (2013.01); *G06F 11/3058* (2013.01); *G06F 11/3089* (2013.01)

(58) Field of Classification Search
  USPC .................................. 713/300, 310, 600, 320
  See application file for complete search history.

(56) References Cited

U.S. PATENT DOCUMENTS

| | | | |
|---|---|---|---|
| 6,885,233 B2 * | 4/2005 | Huard et al. .................. 327/513 |
| 2002/0087287 A1 * | 7/2002 | Dai .............................. 702/132 |
| 2002/0194402 A1 * | 12/2002 | Kung et al. .................... 710/48 |
| 2005/0060589 A1 * | 3/2005 | Athas ........................... 713/300 |
| 2006/0004538 A1 * | 1/2006 | Cancel .......................... 702/136 |
| 2006/0095798 A1 | 5/2006 | Finkelstein et al. | |
| 2006/0136076 A1 | 6/2006 | Rotem et al. | |
| 2006/0161307 A1 * | 7/2006 | Patel et al. .................... 700/277 |
| 2007/0061603 A1 * | 3/2007 | Cox et al. ..................... 713/300 |
| 2008/0148027 A1 | 6/2008 | Fenger et al. | |
| 2008/0313492 A1 * | 12/2008 | Hansen ............................ 714/5 |

* cited by examiner

*Primary Examiner* — Paul Yanchus, III
(74) *Attorney, Agent, or Firm* — Kacvinsky Daisak Bluni PLLC

(57) ABSTRACT

Techniques to manage operational parameters for a processor are described. For instance, a method includes monitoring performance values representing physical characteristics for multiple components of a computing platform, and managing a performance level for a processor based on the performance values and one or more operational parameters for the processor. The operational parameters may include one or more transitory operational parameters that cause the processor to temporarily exceed operational parameters set by a thermal design power limit. Other embodiments are described and claimed.

27 Claims, 5 Drawing Sheets

TECHNIQUES TO MANAGE OPERATIONAL PARAMETERS FOR A PROCESSOR

BACKGROUND

Modern computing systems generate heat during operation. The heat may affect certain platform components of a system, and is therefore generally required to be limited, and such limitations may affect operations of one or more processors. Heat generated by the computing system may be limited using various dynamic thermal management (DTM) techniques. For example, heat generated by a processor may be limited by controlling an operating frequency and operating voltage for the processor, or utilizing a heat sink attached to the processor. Further, various platform-level cooling devices may be implemented for the computing system to perform heat dissipation, such as heat pipes, heat links, heat transfers, heat spreaders, vents, fans, blowers, and liquid-based coolants.

Many DTM techniques typically operate based on fixed assumptions about the thermal characteristics of the parts used for a computing system, such as thermal masses and cooling performance, the corresponding conditions of the system, and the durations of power levels. These assumptions may be imprecise. Furthermore, variations in manufacturing processes and thermal characteristics for different parts (e.g., a heat sink) may lead to different thermal responses. In many operational scenarios, this may cause the DTM techniques and computing system to operate in an inefficient manner.

DETAILED DESCRIPTION

Figure 1:
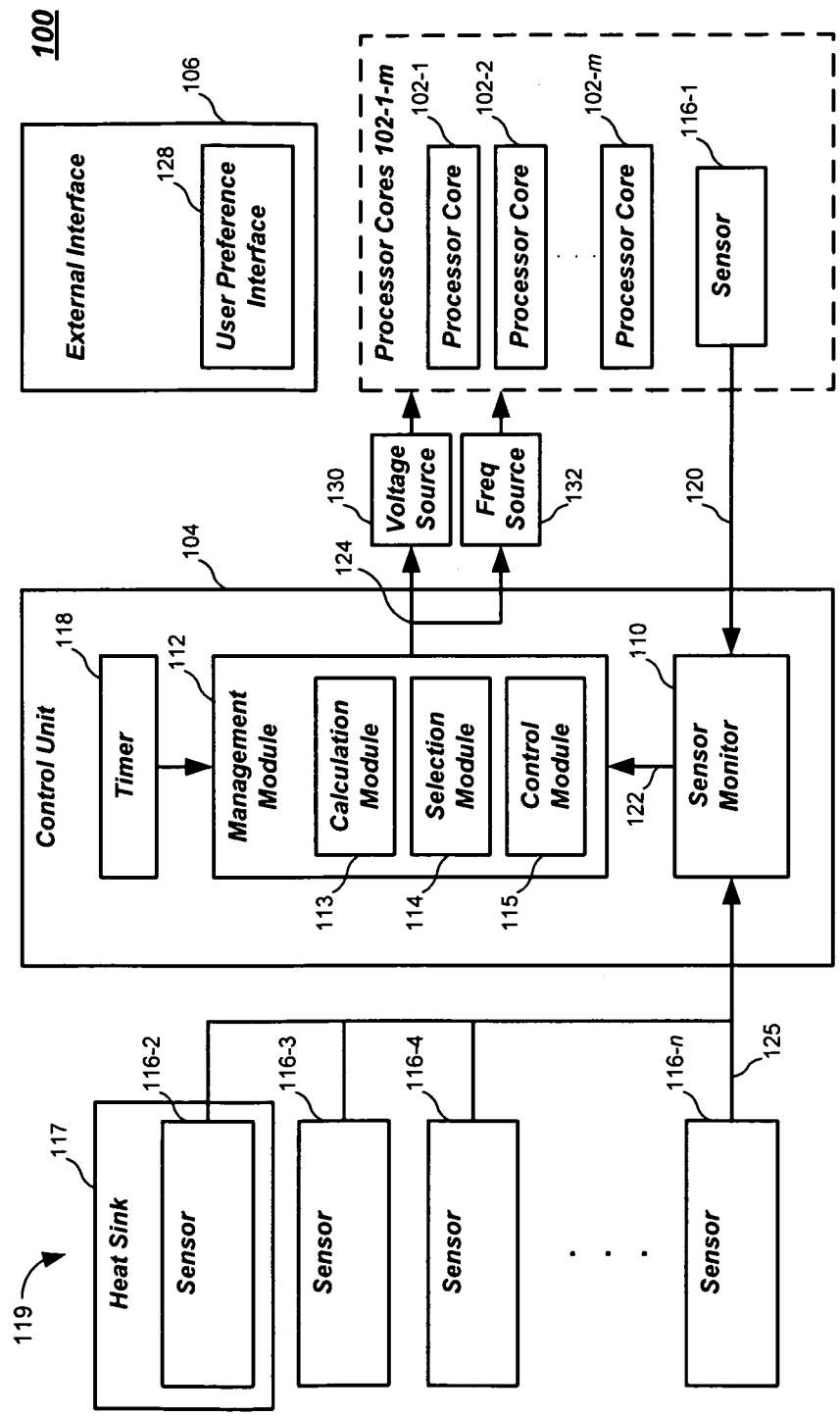
FIG. 1 illustrates one embodiment of an apparatus.

The embodiments are generally directed to techniques designed to manage operational parameters for a processor having one or more processing cores. Various embodiments provide techniques that may dynamically adjust processor performance. For example, such techniques may identify conditions suitable for enhanced performance and adjusts processor performance (e.g., speed) accordingly. Such adjustments may involve changing the operational or performance state (e.g., P-state) for the processor. For example, upon detecting that one or more components of a computing platform in a cold state have additional thermal capacity, techniques may increase processor operations so that the processor runs faster at the cost of producing additional heat power thereby taking advantage of the additional thermal capacity. A cold state can mean any time that the time averaged heat energy added to the system falls below the effective cooling level in any given time period. As a result, processor performance is improved. In contrast, upon detecting that a computing platform has warmed to a steady state, the processor may decrease processor operations so that it runs slower thereby reducing heat power. Such adjustments to processor operation may involve various techniques. Exemplary techniques include modifying one or more operational parameters for the processor, such as frequency, power, voltage, current, P-state, clock signal, and other operational parameters relevant for a processor. In this manner, embodiments control states to adjust to monitored states and conditions in given time periods, rather than limit instantaneous power/performance level according to indefinite sustained worse case set of conditions assumed in a fixed TDP power limit level.

In one embodiment, for example, a method includes monitoring performance values representing physical characteristics for multiple components of a computing platform, and managing a performance level for a processor based on the performance values and one or more operational parameters for the processor. The operational parameters may include one or more transitory operational parameters that cause the processor to temporarily exceed operational parameters set by a thermal design power (TDP) limit. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

FIG. 1 illustrates an exemplary apparatus 100 that may adjust operation based on thermal capacity determinations. The thermal capacity determinations, for example, may be based on performance values stored in memory or measured in real-time.

As shown in FIG. 1, the apparatus 100 may include various elements. For instance, FIG. 1 shows that apparatus 100 may include one or more processor cores 102-1-$m$, a control unit 104, and an external interface 106. Also, apparatus 100 may include various sensors 116-1-$n$. In certain embodiments, the elements of apparatus 100 may be implemented within a single-core or multi-core processor, examples of which are described with reference to FIG. 5. In further embodiments, however, implementations may involve external software and/or external hardware.

The apparatus 100 may include processor cores 102-1-$m$ arranged to perform operations that produce specific outputs for a given set of inputs. Such inputs may be instructions associated with an instruction set. In embodiments, the processor cores 102-1-$m$ may be implemented with a plurality of logic gates and may be designed for general-purpose functions.

The processor cores 102-1-$m$ may operate in various active mode states. For example, apparatus 100 may operate in different performance states (also called "P-states"). Each of these P-states has a corresponding operational frequency and voltage level. In particular, P-states having higher voltages and frequencies provide greater performance (e.g., greater speed). As previously indicated, however, such increases in performance produce greater heat power and power consumption, thereby placing additional strain on the DTM system.

The external interface 106 may provide for the exchange of information with various external devices through one or more interconnections. Such devices may include (but are not limited to) memory (e.g., dynamic random access memory (DRAM)), graphics chips, input-output (I/O) devices, and/or disk drives. Exemplary interconnections include one or more bus interfaces and/or one or more point-to-point interfaces. Embodiments, however, are not limited to these examples. Accordingly, external interface 106 may include control logic and electronics (e.g., transceivers) to facilitate such exchanges of information.

The external interface 106 may include a user preference interface 128. The user preference interface 128 may operate as an interface to display information for a user or operator using various graphic user interface (GUI) elements. The user preference interface 128 may also operate to receive information from a user, such as user commands, user preferences, and so forth. In particular, the user preference interface 128 may receive performance values, control directives and preference information for the processor cores **102-1-*m*, the control unit 104, and the sensors 116-1-*n*, among other elements of apparatus 100**.

The control unit 104 is arranged to control performance levels for the processor cores **102-1-*m*. This may be accomplished, for example, by the control unit 104 establishing various operational parameters for the processor cores 102-1-*m*. These established operational parameters are based in part on an assessed thermal capacity for the apparatus 100 and/or a computing platform including the apparatus 100. As shown in FIG. 1, control unit 104 includes a sensor monitor 110, a management module 112 and a timer 118**.

The sensor monitor 110 is arranged to monitor performance values representing physical characteristics for multiple components of a computing platform. A computing platform, such as a desktop or notebook computer, includes various platform components 119. Examples of platform components 119 may include processors, controllers, memory units, power supplies, liquid crystal displays (LCD), I/O devices (e.g., keyboard, mouse, touch screen, touch pad), interconnects, housings, DTM systems, software applications, and so forth. The apparatus 100 may comprise different sensors **116-1-*n* designed to monitor various components of the computing platform. The sensors 116-1-*n* are each arranged to sense a particular physical characteristic for its component, and send a signal representing a performance value for its component to the sensor monitor 110**.

In various embodiments, the sensor monitor 110 is operative to monitor a performance value representing a temperature for the processor, a performance value representing a temperature for a component, or a performance value representing power consumption for a component or the computing platform, among other types of performance values. For example, the sensor monitor 110 may be arranged to monitor temperatures from different platform components 119 utilizing different temperate sensors that include a thermistor-based circuit. For example, the sensor 116-1 may comprise a temperature sensor to monitor a temperature for the processor cores **102-1-*m*, or an ambient temperature around the processor cores 102-1-*m*. The sensor 116-2 may comprise a temperature sensor to monitor a temperate for a heat sink 117, or an ambient temperature around the heat sink 117. The sensor 116-3 may comprise a temperature sensor to monitor a temperate for a housing, such as a notebook housing (or "skin") that may come into contact with a human operator. The sensor 116-4 may comprise a power measurement sensor to measure total power output consumed by the computing platform. It may be appreciated that these are merely some examples, and any number and type of sensors 116-1-*n* may be implemented for any number of platform components 119** as desired for a given implementation.

Other operational values may be monitored as well. In addition to, or in lieu of, a thermal sensor, the sensor 116-1 for the processor cores **102-1-*m* may be a sensor designed to detect a performance value representing state information for the one or more processor cores 102-1-*m*. For example, the sensor 116-1 may detect a performance state or performance level for a given processor core 102-1-*m*. In another example, the sensor 116-1 may detect an operational frequency and/or voltage for a given processor core 102-1-*m*. The information collected by the sensor 116-1, or the other sensors 116-2-*n*, may be fed to the control unit 104. The timer 118 may be used to measure a time interval for when the various processor cores 102-1-*m* are in the various monitored states. The timer 118** may further include a set of counters to maintain the measured time intervals.

As shown in FIG. 1, the sensors **116-1-*n* may provide management module 112 with a signal 125 that periodically or continuously indicates the performance value (e.g., temperature, power, etc.) for a platform component 119. Based on this signal, management module 112 may determine the amount of additional power consumption that apparatus 100 may handle without causing a maximum temperature to be exceeded. This additional power consumption is referred to as "headroom". This may be discussed in more detail with reference to FIG. 4**.

The management module 112 is communicatively coupled to the sensor monitor 110. The management module 112 is arranged to manage performance levels for one or more of the processor cores **102-1-*m* based on the performance values and one or more operational parameters for the processor cores 102-1-*m*. Examples of the operational parameters for the processor cores 102-1-*m* may include without limitation a frequency, power, voltage, current, state, P-state, clock signal, energy, and other operational parameters relevant for the processor cores 102-1-*m***.

In some embodiments, the management module 112 may collect and analyze historical data for certain operational parameters. In one embodiment, for example, the management module 112 can calculate a time a processor is in a given performance state, and manage performance levels for one or more of the processor cores **102-1-*m*** based on the accumulated time in each performance state.

The management module 112 may control, modify or otherwise adjust a performance level for the processor cores **102-1-*m* by issuing a control directive or signal 124 to the processor cores 102-1-*m* or elements coupled to the processor cores 102-1-*m*. This directive instructs the processor cores 102-1-*m*** to operate according to the selected operational parameters.

In various embodiments, for example, the management module 112 may send the signal 124 as a voltage level signal or a frequency level signal to a respective voltage source 130 or a frequency source 132. The operational performance of the processor cores **102-1-*m* may be controlled in part by the voltage source 130 and/or the frequency source 132. For example, the voltage source 130 may comprise a variable regulator and the frequency source 132 may comprise a voltage controlled oscillator (VCO), among other components. The management module 112 may vary the voltage and/or frequency (e.g., a particular P-state) of the processor cores 102-1-*m* by controlling the corresponding sources 130, 132, which may adjust their output to one or more of the processor cores 102-1-*m* accordingly. Alternatively or additionally, the management module 112 may adjust clock toggling settings for the processor cores 102-1-*m***.

In embodiments, the operational parameters may be arranged to cause the processor cores **102-1-*m*** to operate within a steady-state thermal design power or thermal design point (collectively referred to as "TDP") limit. The TDP limit represents the maximum amount of power the cooling system in a computer is required to dissipate indefinitely. For example, a CPU cooling system for a laptop computer may be designed for a 20 Watt (W) TDP limit, which means that it can dissipate 20 W of heat without exceeding the maximum junction temperature for the chip. The cooling technique may implement various heat transfer techniques, including an active cooling mechanism such as a fan, a passive cooling mechanism via natural convection, or heat radiation. The TDP limit is typically not the most power the chip could ever draw, but rather the maximum power that it would draw when in a normal operating mode. This ensures the computer will be able to handle all applications without exceeding its thermal envelope, and without requiring a cooling system for the maximum theoretical power, which would cost more at a marginal benefit. The TDP limit can be defined in different ways by different manufacturers, but in most cases the TDP limit is measured at the geometric center on the topside of the processor integrated heat spreader. For processors without integrated heat spreaders such as mobile processors, the thermal design power is sometimes referred to as the junction temperature (Tj).

In some embodiments, the operational parameters may include one or more transitory operational parameters that cause the processor to temporarily exceed the TDP limit for the apparatus 100. The TDP limit for a given computing platform is typically defined based on steady state values for the computing platform. For example, a typical TDP limit for the apparatus 100 as implemented in a notebook computer may be set for an ambient temperature of 35 degrees Celsius (C) for a non-air conditioned environment, an instruction mix of 80% of peak instruction mix for the processor cores 102-1-$m$, and a leakage power of about 6 W. When the computing platform is in a cold state, however, there is additional "thermal headroom" present in the various platform components 119 for the computing platform. A cold state can mean any time that the time averaged heat energy added to the system falls below the effective cooling level in any given time period. For example, the heat sink 117 has a relatively high thermal mass, and therefore when the heat sink 117 is in a cold state it can absorb more heat power thereby providing additional thermal headroom for the processor cores 102-1-$m$. This may be true for other platform components 119 as well.

The management module 112 may take advantage of the additional thermal headroom provided by a cold system to allow the processor cores 102-1-$m$ to operate in a higher performance state (e.g., P-state) for a limited period of time to improve processor performance (e.g., speed) while avoiding damage to the processor cores 102-1-$m$ or other platform components 119 of a computer platform. As shown in FIG. 1, the management module 112 includes a calculation module 113, a selection module 114 and a control module 115.

The calculation module 113 may be generally arranged to determine various performance states for one or more of the processor cores 102-1-$m$. This may be accomplished in a number of different ways, including based on a temperature for the processor cores 102-1-$m$ as measured by the sensor 116-1, a temperature for the heat sink 117 as measured by the sensor 116-2, and so forth. The performance states may comprise any defined performance states. Examples of performance states may include without limitation those performance states as defined by an Advanced Configuration and Power Interface (ACPI) suite of specifications, such as the ADVANCED CONFIGURATION AND POWER INTERFACE SPECIFICATION, Revision 3.0b, Oct. 10, 2006 (the "ACPI Specification"), and its revisions, progeny and variants. The ACPI Specification defines a power management system that allows a computer operation system to control the amount of power consumed by a processor and peripheral devices of the computer system. According to the ACPI Specification, exemplary performance states may comprise global states (e.g., G0-G3), device states (e.g., D0-D3), and processor states (e.g., C0-C3), among others.

Additionally or alternatively, the calculation module 113 may be further arranged to determine a transitory performance state for one or more of the processor cores 102-1-$m$ based on one or more transitory operational parameters. In some cases, the transitory performance state may be referred to as a "dynamic turbo" performance state. More particularly, the calculation module 113 may determine the transitory operational parameters based on thermal headroom for one or more components of the computing platform when in a cold state. The calculation module 113 may determine the transitory operational parameters from a look-up table stored in memory, user preference information established via the user preference interface 128, or in real-time based on incoming data received by the management module 112 via the sensor monitor 110 (or other inputs).

The transitory operational parameters may represent a frequency level or a voltage level above a maximum frequency level or a maximum voltage level set by the TDP limit of the apparatus 100 or a computing platform utilizing the apparatus 100. The frequency level or voltage level for the processor cores 102-1-$m$ may have upper bounds or maximum values that are typically set to ensure that the performance level of the processor cores 102-1-$m$ remain within the TDP limit established for the processor cores 102-1-$m$. The transitory operational parameters, however, may comprise frequency level values or voltage level values that are generally higher than the upper bounds established by the TDP limit. The precise magnitude of the difference may vary in accordance with the amount of thermal headroom estimated for a given apparatus 100 or computing platform implementing the apparatus 100. This may be generated from pre-computed values for the various platform components 119, or as calculated in real-time during operation of the apparatus 100. The embodiments are not limited in this context.

The management module 112 may establish a transitory performance level for a processor based on the performance values and/or the one or more transitory operational parameters. One of the transitory operational parameters may comprise a time parameter. For example, the management module 112 may generate or retrieve a transitory time interval. The transitory time interval may represent a defined time interval the processor cores 102-1-$m$ can operate at the transitory performance level above the TDP limit. As with the transitory operational parameters, the transitory performance level may comprise a time period that varies in accordance with an estimate as to how quickly a given apparatus 100 or computing platform implementing the apparatus 100 moves from a cold state to a steady state used to calculate the TDP limit. The transitory time interval may allow the management module 112 to instruct one or more processor cores 102-1-$m$ to enter and/or exit from the transitory performance level based on predefined time intervals as indicated by the transitory time interval. This may be accomplished using the timer 118 of the control unit 104. For example, the management module 112 may have one or more processor cores 102-1-$m$ enter a transitory performance level for 20 seconds, and then enter a lower performance level for 20 seconds to "rest." This cycling may continue until the effective time-averaged TDP power limit level is reached. The interval and periodicity of the cycles may be established based on real-time measurements or values stored in memory. The embodiments are not limited in this context.

The selection module 114 may be generally arranged to select operational parameters corresponding to the determined performance state, such as an operating frequency and an operating voltage. In embodiments, the selection module 114 may select the operational parameters from a performance state table.

Once the selection module 114 selects the appropriate operational parameters, the selection module 114 may output the selected operational parameters to the control module 115. The control module 115 may be arranged to generate and send a voltage control signal and/or a frequency control signal to the respective voltage source 130 and/or the frequency source 132 to control the performance state for the processor cores 102-1-$m$.

Utilizing the various modules 113-115, the management module 112 is designed to increase the performance state for the processor cores 102-1-$m$ to a transitory performance state based on the transitory operational parameters when all of the performance values for the platform components 119 are below their corresponding threshold values. In this manner, the impact on the various platform components 119 for the computing platform that may be affected by the transitory performance state, and its corresponding heat power and power consumption characteristics, may be reduced. As a result, the processor performance provided by the processor cores 102-1-$m$ may be increased to provide enhanced speed to execute tasks for various applications, as long as the performance values are within normal tolerances.

The management module may decrease the performance state from a transitory performance level for the processor cores 102-1-$m$ when one of the performance values for a component is above its corresponding threshold value or on expiration of a transitory time interval. This helps to protect the processing cores 102-1-$m$ and the platform components 119 from reduced performance, failure or damage caused by the transitory performance level operations.

The transitory performance level may be implemented for a single processor core or multiple processor cores. When implemented for a processor with multiple processor cores, the management module 112 may control the performance levels for the multiple processor cores 102-1-$m$ individually or collectively to establish the transitory performance level for the processor. For example, a single processor core 102-1 may be increased to the transitory performance level while the other processor cores 102-2-$m$ remain idle. In another example, the performance level for all processor core 102-1-$m$ may be increased in an equal manner to establish the transitory performance level for the processor. In yet another example, each processor core 102-1-$m$ may be increased or decreased to different performance levels to provide an average performance level equal to the transitory performance level. In still another example, the performance level of processor cores 102-1-$m$ in an active mode may be increased while processor cores 102-1-$m$ in an idle mode are not, and vice-versa. The management module 112 may control performance levels for a multi-core processor by adjusting the processor cores 102-1-$m$ in any number of different combinations as long as it allows the multi-core processor to collectively operate at the transitory performance level. The embodiments are not limited in this context.

Figure 2:
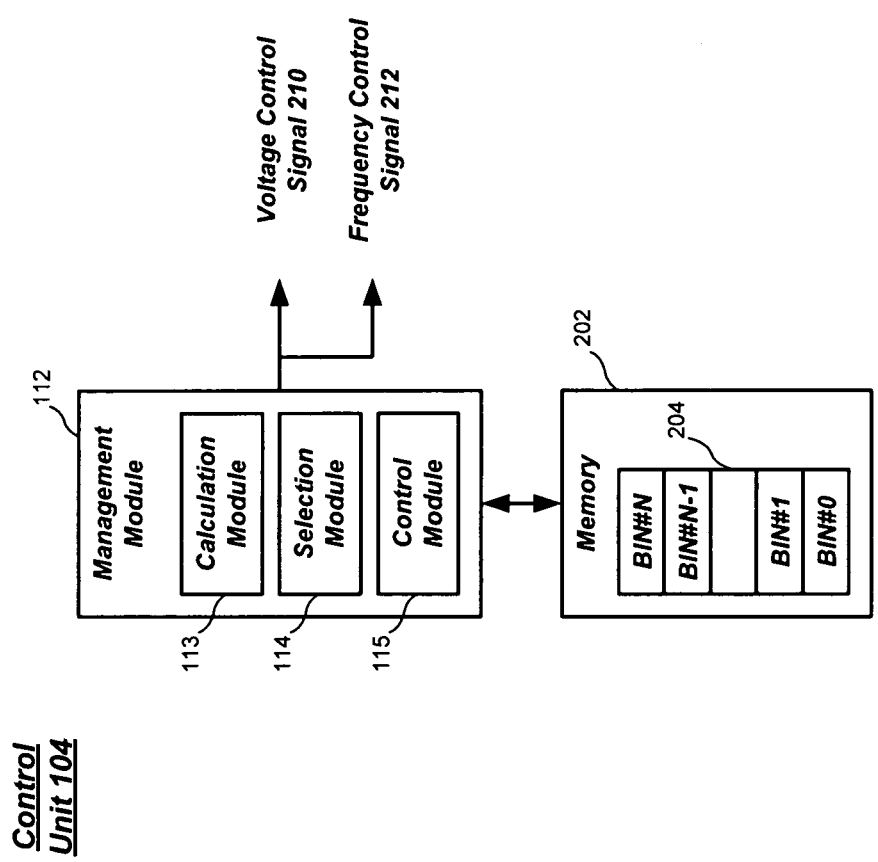
FIG. 2 illustrates one embodiment of a control unit.

FIG. 2 illustrates a more detailed block diagram for the control unit 104 suitable for use with the apparatus 100. In the illustrated embodiment shown in FIG. 2, the control unit 104 is communicatively coupled to a memory unit 202. The memory unit 202 may comprise any type of memory unit as described in more detail with reference to FIG. 5.

The memory unit 202 may store a performance state table 204. The performance state table 204 may store a mapping between ranges of performance states and operating parameters for the performance states. For example, the performance state table 204 may comprise multiple bins, with each bin storing an operational parameter corresponding to a performance state of the processor cores 102-1-$m$. As shown in FIG. 2, the performance state table 204 may comprise multiple bins designated as Bin#0, Bin#1 . . . . Bin#N-1, and Bin#N. Each bin may store a voltage value, a frequency value, or a voltage value and a frequency value, among other values.

In embodiments, Bin#N may include maximum values of frequency and voltage that may be suitable for the operation of the processor cores 102-1-$m$, and Bin#0 may include minimum values of voltage and frequency that may be suitable for the operation of the processor cores 102-1-$m$. For example, Bin#0 may be set as a lower bound of voltage and/or frequency values and Bin#N may be set as an upper bound of voltage and/or frequency values. The upper bound may be set in accordance with a TDP limit for the apparatus 100 or a computing platform incorporating the apparatus 100.

According to some embodiments, the upper bound may be occasionally exceeded by the transitory operational parameters for a transitory time interval, as determined by the management module 112. For instance, the management module 112 may increase the performance level of one or more processor cores 102-1-$m$ to a transitory performance level using a voltage level and/or frequency level that is above the upper bound as long as the performance values for the processor cores 102-1-$m$ and/or the platform components 119 are not exceeded. Additionally or alternatively, the upper bound may be dynamically adjusted to accommodate the transitory operational parameters.

Once one or more constraints are exceeded, the management module 112 reduces the processor cores 102-1-$m$ from the transitory performance level to a lower performance level. This may be accomplished by calculating the target performance level, selecting the operational parameters for the target performance level from the performance state table 204 from the appropriate Bin#, and sending a voltage control signal 210 and/or a frequency control signal 212 to the respective sources 130, 132 to establish the target performance level for the processor cores 102-1-$m$.

Assigning operating parameters may come at some cost. For example changing operating frequency and voltage involves locking PLL and changing the voltage which may take some time. Frequently changing the operating parameters may not be desirable. In some cases, timer 118 can be used to limit operating characteristics change to not more then pre-defined transitions/second.

Embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 3:
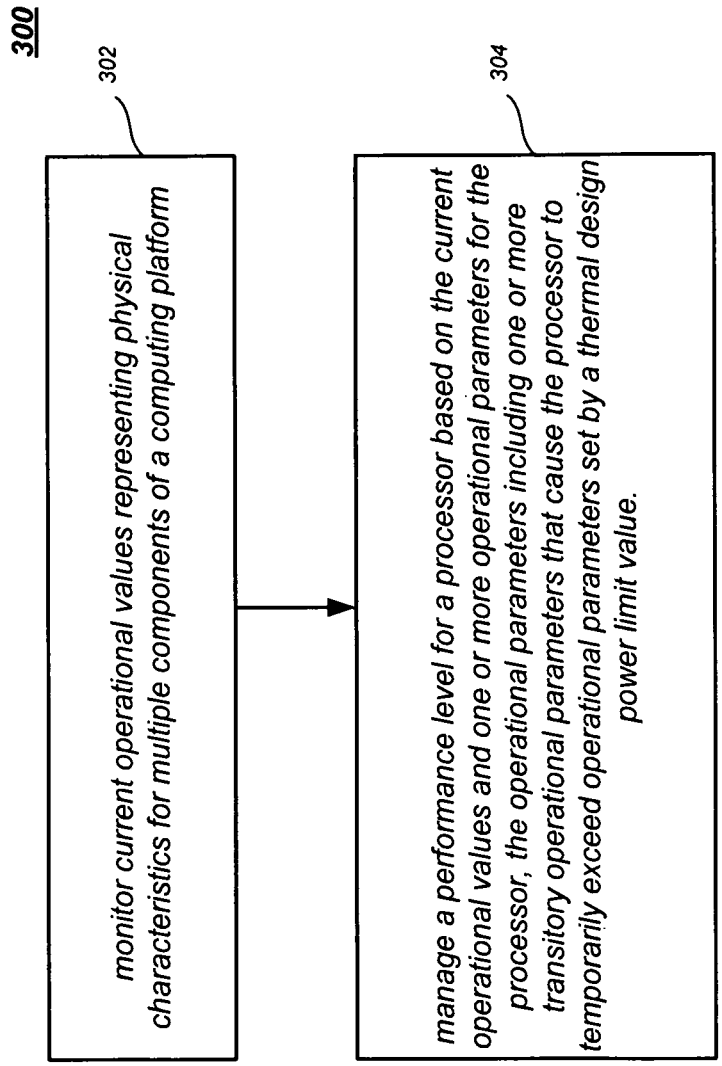
FIG. 3 illustrates one embodiment of an exemplary logic flow.

FIG. 3 is a diagram of an exemplary logic flow 300 involving the determination and establishment of a transitory performance mode for the processor cores 102-1-*m*. Although this diagram shows a particular sequence, other sequences may be employed. Also, the depicted operations may be performed in various parallel and/or sequential combinations.

As shown in FIG. 3, the logic flow 300 may monitor performance values representing physical characteristics for multiple components of a computing platform at block 302. For example, the sensor monitor 110 may monitor performance values representing physical characteristics for multiple platform components 119 of a computing platform implementing the apparatus 100. The physical characteristics may comprise any measurable physical quantity, such as temperature, power, voltage, frequency, current, state, and so forth.

The logic flow 300 may manage a performance level for a processor based on the performance values and one or more operational parameters for the processor, the operational parameters including one or more transitory operational parameters that cause the processor to temporarily exceed operational parameters set by a thermal design power limit. For example, the management module 112 may manage a performance level for one or more processor cores 102-1-*m* based on the performance values and one or more operational parameters for the processor cores 102-1-*m*. For instance, the operational parameters may include a voltage and/or a frequency. The operational parameters may include one or more transitory operational parameters that cause the processor to temporarily exceed operational parameters set by the TDP limit as stored in the memory unit 202 with the performance state table 204. In some cases, where operating conditions allow, the management module 112 may send a control directive 124 to establish a transitory performance level for the processor cores 102-1-*m* using the transitory operational parameters. Further, the management module 112 may establish the transitory performance level for a defined time interval in accordance with a transitory time interval.

Figure 4:
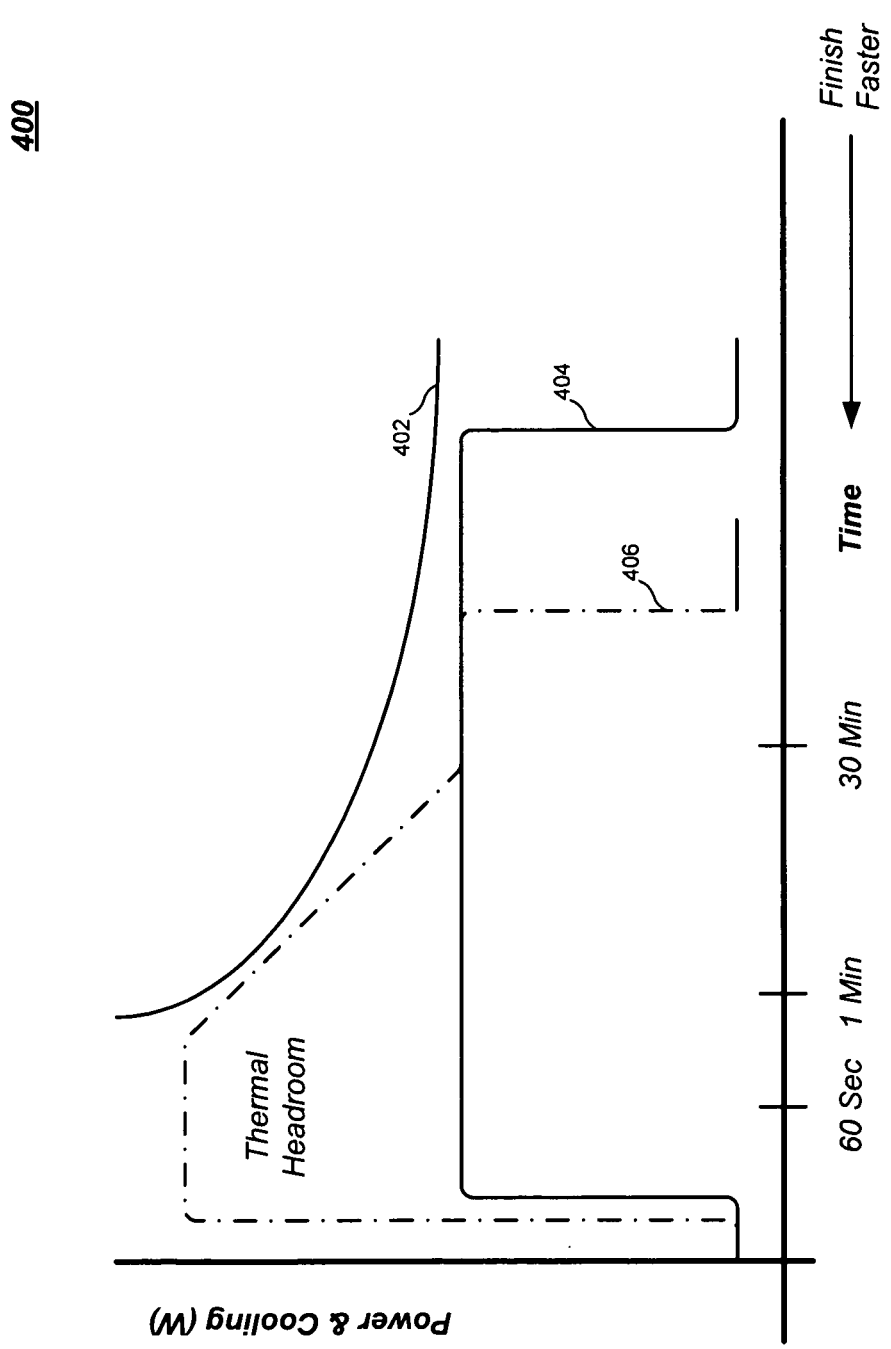
FIG. 4 illustrates one embodiment of a performance graph.

FIG. 4 is a graph 400 that includes plots of power and cooling in W as a function of time. These plots are provided for purposes of illustration, and not limitation. For instance, graph 400 includes a plot 402 showing a cooling limit set in accordance with a TDP limit constraint until reaching a steady state of 35 degrees C. ambient temperature. A plot 404 shows a profile in which a task for an application is executed by the apparatus 100 at a performance level that does not exceed the steady state of 35 degrees C. ambient. By way of contrast, a plot 406 shows a profile in which the same task for an application is executed by the apparatus 100 at a transitory performance level that temporarily exceeds the steady state cooling limit. As described herein, there is typically excess thermal headroom in the various platform components 119 when in a cold state. A cold state can mean any time that the time averaged heat energy added to the system falls below the effective cooling level in any given time period. The plot 406 illustrates an ideal performance profile where the application task is executed at an enhanced speed without causing damage to the apparatus 100.

Additionally or alternatively, the control unit 104 may control a performance level for the processor cores 102-1-*m* utilizing performance values stored in a memory unit. In operation, the management module 112 may be arranged to receive performance values from the external interface 106, with the performance values specifically defined for one or more components of the computing platform. For example, as previously described, the external interface 106 may include or receive OEM platform parameters. The OEM may characterize and validate its platform and set desired operational parameters for the control unit 104. The OEM platform parameters can be communicated, for example, via a BIOS. The management module 112 may use the OEM platform parameters to control performance levels for one or more processor cores 102-1-*m*. This may be in addition to, or as an alternative to, the performance values provided by the sensors 116-1-*n*. The embodiments are not limited in this context.

Figure 5:
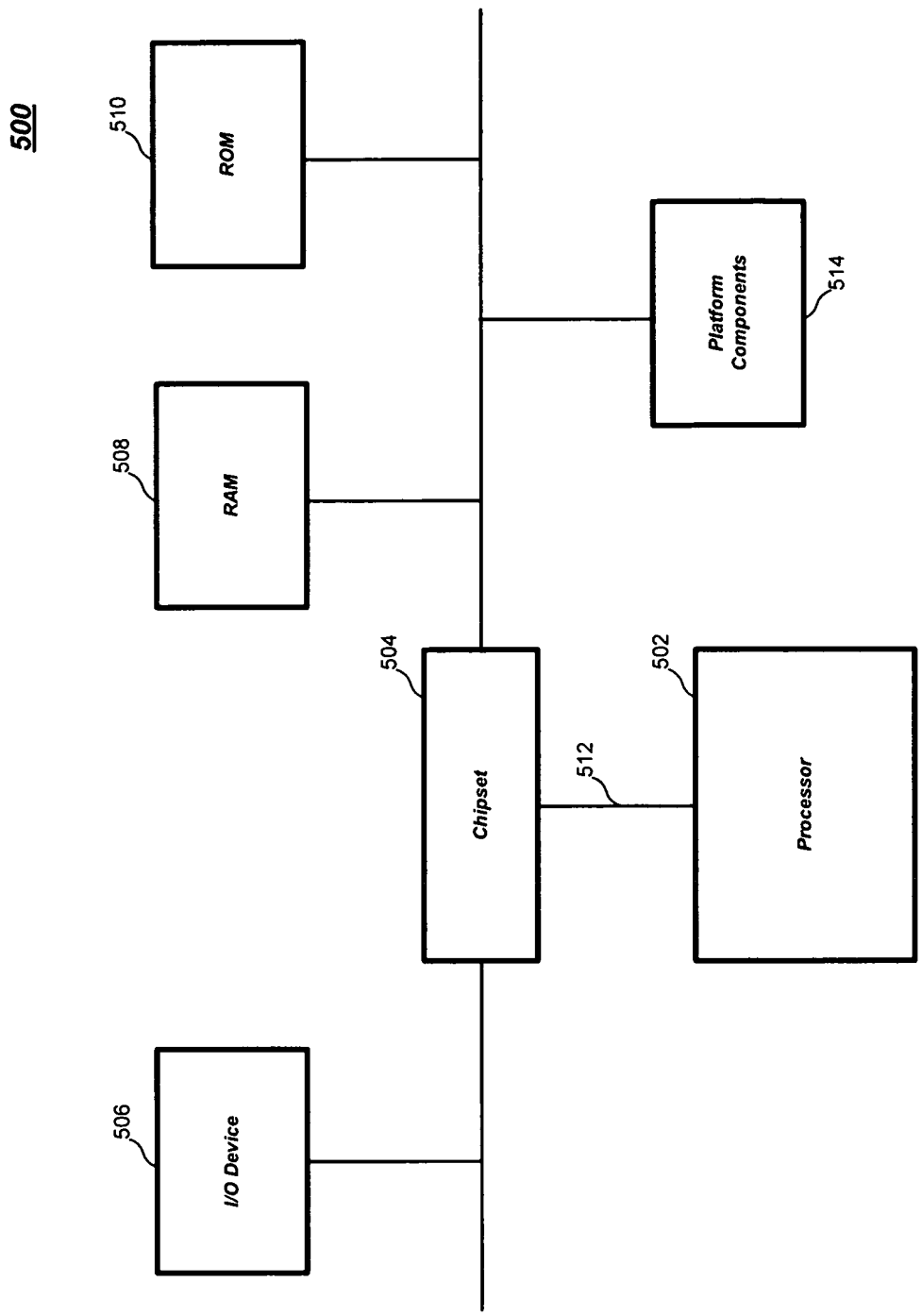
FIG. 5 illustrates one embodiment of an exemplary system.

FIG. 5 is a diagram of an exemplary system embodiment. In particular, FIG. 5 is a diagram showing a system 500, which may include various elements. For instance, FIG. 5 shows that system 500 may include a processor 502, a chipset 504, an input/output (I/O) device 506, a random access memory (RAM) (such as dynamic RAM (DRAM)) 508, and a read only memory (ROM) 510, and various platform components 514 (e.g., a heat sink, DTM system, cooling system, housing, vents, and so forth). These elements may be implemented in hardware, software, firmware, or any combination thereof. The embodiments, however, are not limited to these elements.

In particular, the platform components 514 may include a cooling system implementing various DTM techniques. The cooling system may be sized for the system 500, and may include any cooling elements designed to perform heat dissipation, such as heat pipes, heat links, heat transfers, heat spreaders, vents, fans, blowers, and liquid-based coolants.

As shown in FIG. 5, I/O device 506, RAM 508, and ROM 510 are coupled to processor 502 by way of chipset 504. Chipset 504 may be coupled to processor 502 by a bus 512. Accordingly, bus 512 may include multiple lines.

Processor 502 may be a central processing unit comprising one or more processor cores (102-1-*m*). The processor 502 may include any type of processing unit, such as, for example, CPU, multi-processing unit, a reduced instruction set computer (RISC), a processor that have a pipeline, a complex instruction set computer (CISC), digital signal processor (DSP), and so forth.

Processor 502 may operate at different performance levels. Accordingly, processor 502 may enter into various operational states, such as one or more active mode P-states. Thus, processor 502 may include features described above with reference to FIGS. 1-3. For instance, processor 502 may include the elements of apparatus 100, among others.

Although not shown, the system 500 may include various interface circuits, such as an Ethernet interface and/or a Universal Serial Bus (USB) interface, and/or the like. In some exemplary embodiments, the I/O device 506 may comprise one or more input devices connected to interface circuits for entering data and commands into the system 500. For example, the input devices may include a keyboard, mouse, touch screen, track pad, track ball, isopoint, a voice recognition system, and/or the like. Similarly, the I/O device 506 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 500 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a storage medium, a computer-readable medium or an article of manufacture which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It should be understood that embodiments may be used in a variety of applications. Although the embodiments are not limited in this respect, certain embodiments may be used in conjunction with many electronic devices, such as a personal computer, a desktop computer, a mobile computer, a laptop computer, a notebook computer, a tablet computer, a server computer, a network, a Personal Digital Assistant (PDA) device, a wireless communication station, a wireless communication device, a cellular telephone, a mobile telephone, a wireless telephone, a Personal Communication Systems (PCS) device, a PDA device which incorporates a wireless communication device, a smart phone, or the like. Embodiments may be used in various other apparatuses, devices, systems and/or networks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a processor having one or more processor cores;
a control unit operative by the processor to control performance levels for the processor, the control unit comprising:
a sensor monitor operative to directly monitor performance values representing physical characteristics for at least one cooling component of a computing platform arranged as part of the apparatus but physically separate from a circuit comprising the processor, the at least one cooling component comprising at least one platform-level cooling component to perform heat dissipation comprising at least one of a heat pipe, heat link, heat transfer, heat spreader, vent, fan, blower, or liquid-based coolant;
a calculation module communicatively coupled to the sensor module, the calculation module operative to estimate a thermal headroom for one or more components of the computing platform and to determine one or more transitory operational parameters based on the estimated thermal headroom; and
a management module communicatively coupled to the sensor monitor and the calculation module, the management module operative to manage performance levels for the processor based on the performance values and the one or more operational parameters for the processor, the operational parameters including the one or more transitory operational parameters, the one or more transitory operational parameters to cause the processor to temporarily exceed operational parameters set by a thermal design power limit.

2. The apparatus of claim 1, the transitory operational parameters including a transitory operational parameter representing a frequency level or a voltage level above a maximum frequency level or a maximum voltage level set by the thermal design power limit.

3. The apparatus of claim 1, the management module operative to establish a transitory performance level for a processor based on the performance values, the one or more transitory operational parameters, and a transitory time interval representing a defined time interval the processor can operate above the thermal design power limit.

4. The apparatus of claim 1, the management module operative to receive performance values from an external interface, the performance values defined for components of the computing platform.

5. The apparatus of claim 1, comprising a selection module operative to select an operating frequency or operating voltage corresponding to a performance state for the processor from a performance state table.

6. The apparatus of claim 1, comprising a memory unit to store a performance state table, the performance state table having multiple bins, with each bin storing a voltage value, a frequency value, or a voltage value and a frequency value.

7. The apparatus of claim 1, comprising a control module operative to send a voltage control signal or a frequency control signal to a respective voltage source or frequency source to control the performance state for the processor.

8. The apparatus of claim 1, the management module operative to increase the performance state to a transitory performance state for the processor based on the transitory operational parameters when all of the performance values for the components are below their corresponding threshold values.

9. The apparatus of claim 1, the management module operative to decrease the performance state from a transitory performance for the processor when one of the performance values for a component is above its corresponding threshold value or on expiration of a transitory time interval.

10. The apparatus of claim 1, the processor comprising two or more processor cores, and wherein the operational parameters are coordinated between the two or more processor cores.

11. The apparatus of claim 1, the sensor monitor operative to monitor a performance value representing a temperature for the processor, a performance value representing a state for the processor, a performance value representing a temperature for a component, or a performance value representing power consumption for a component or the computing platform.

12. A system, comprising:
a liquid crystal display; and
a processor having multiple processor cores and a control unit, the control unit operative to control performance levels for the processor cores of the processor, the control unit comprising:
a sensor monitor operative to directly monitor operational values representing physical characteristics for one or more cooling components of a computing platform arranged as part of the system but physically separate from a circuit comprising the processor, the one or more cooling component comprising one or more platform-level cooling components to perform heat dissipation comprising one or more of a heat pipe, heat link, heat transfer, heat spreader, vent, fan, blower, or liquid-based coolant;
a calculation module communicatively coupled to the sensor module, the calculation module operative to estimate a thermal headroom for one or more components of the computing platform and to determine one or more transitory operational parameters based on the estimated thermal headroom; and
a management module communicatively coupled to the sensor monitor and the calculation module, the management module operative to manage performance levels for the processor based on the performance values and the one or more operational parameters for the processor, the operational parameters including the one or more transitory operational parameters, the one or more transitory operational parameters to cause the processor to temporarily exceed operational parameters set by a thermal design power limit.

13. The system of claim 12, the transitory operational parameters including a transitory operational parameter representing a frequency level or a voltage level above a maximum frequency level or a maximum voltage level set by the thermal design power limit.

14. The system of claim 12, the transitory operational parameters including a transitory time interval comprising a defined time interval the processor can operate above the thermal design power limit.

15. The system of claim 12, comprising a sensor for each of a plurality of components of the system, each sensor operative to sense a physical characteristic for its component, and send a signal representing a performance value for its component to the sensor monitor.

16. The system of claim 12, comprising a user preference interface operative to receive user preference information, the management module to establish the one or more operational parameters for the processor in accordance with the transitory operational parameters and the user preference information.

17. A method, comprising:
directly monitoring performance values representing physical characteristics for one or more cooling components arranged as part of a computing platform other than and arranged physically separate from a circuit comprising a processor, the one or more cooling components comprising one or more platform-level cooling components to perform heat dissipation comprising one or more of a heat pipe, heat link, heat transfer, heat spreader, vent, fan, blower, or liquid-based coolant;
estimating a thermal headroom for one or more components of the computing platform;
determining transitory operational parameters based on the estimated thermal headroom; and
managing a performance level for the processor based on the performance values and one or more operational parameters for the processor, the operational parameters including the one or more transitory operational parameters, the one or more transitory operational parameters to cause the processor to temporarily exceed operational parameters set by a thermal design power limit.

18. The method of claim 17, the transitory operational parameters including a transitory operational parameter representing a frequency level or a voltage level above a maximum frequency level or a maximum voltage level set by the thermal design power limit.

19. The method of claim 17, the transitory operational parameters including a transitory time interval comprising a defined time interval the processor can operate above the thermal design power limit.

20. The method of claim 17, comprising increasing the performance state to a transitory performance state for the processor based on the transitory operational parameters when all of the performance values for the components are below their corresponding threshold values.

21. The method of claim 17, comprising decreasing the performance state from a transitory performance for the processor when one of the performance values for a component is above its corresponding threshold value or on expiration of a transitory time interval.

22. An article comprising a non-transitory storage medium containing instructions that if executed enable a system to:

directly monitor performance values representing physical characteristics for one or more cooling components arranged as part of a computing platform other than and arranged physically separate from a circuit comprising a processor the one or more cooling components comprising one or more platform-level cooling components to perform heat dissipation comprising one or more of a heat pipe, heat link, heat transfer, heat spreader, vent, fan, blower, or liquid-based coolant;

estimate a thermal headroom for one or more components of the computing platform;

determine transitory operational parameters based on the estimated thermal headroom; and manage a performance level for the processor based on the performance values and the transitory operational parameters that cause the processor to temporarily exceed operational parameters set by a thermal design power limit.

23. The article of claim 22, the transitory operational parameters including a transitory operational parameter representing a frequency level or a voltage level above a maximum frequency level or a maximum voltage level set by the thermal design power limit.

24. The article of claim 22, the transitory operational parameters including a transitory time interval comprising a defined time interval the processor can operate above the thermal design power limit.

25. The article of claim 22, further comprising instructions that if executed enable the system to increase the performance state to a transitory performance state for the processor based on the transitory operational parameters when all of the performance values for the components are below their corresponding threshold values.

26. The article of claim 22, further comprising instructions that if executed enable the system to decrease the performance state from a transitory performance for the processor when one of the performance values for a component is above its corresponding threshold value or on expiration of a transitory time interval.

27. The article of claim 22, further comprising instructions that if executed enable the system to coordinate the transitory operational parameters between multiple processor cores.

* * * * *